United States Patent
Rauworth et al.

(10) Patent No.: US 6,955,185 B2
(45) Date of Patent: Oct. 18, 2005

(54) HIGH VOLUME DISPENSE HEAD WITH SEAL VERIFICATION AND LOW FOAM RETURN LINE

(75) Inventors: Barry L. Rauworth, Young America, MN (US); John M. Hennen, Eden Prairie, MN (US)

(73) Assignee: Entegris, Inc., Chaska, MN (US)

( * ) Notice: Subject to any disclaimer, the term of this patent is extended or adjusted under 35 U.S.C. 154(b) by 309 days.

(21) Appl. No.: 10/194,982

(22) Filed: Jul. 11, 2002

(65) Prior Publication Data

US 2003/0010387 A1   Jan. 16, 2003

Related U.S. Application Data

(60) Provisional application No. 60/305,061, filed on Jul. 12, 2001.

(51) Int. Cl.[7] .................................................. B67D 5/60
(52) U.S. Cl. ...................... 137/588; 137/563; 222/424; 222/559; 251/149.6
(58) Field of Search ................................ 137/322, 588, 137/563; 222/382, 424, 481.5, 559; 251/149.6

(56) References Cited

U.S. PATENT DOCUMENTS

| | | |
|---|---|---|
| 4,134,522 A | 1/1979 | Patzke et al. |
| 4,699,298 A | 10/1987 | Grant et al. |
| 4,832,237 A | 5/1989 | Hurford, Jr. |
| 4,929,293 A | 5/1990 | Osgar |
| 4,984,717 A | 1/1991 | Burton |
| 5,108,015 A | 4/1992 | Rauworth et al. |
| 5,121,857 A | 6/1992 | Hutchinson |
| 5,526,956 A * | 6/1996 | Osgar .......................... 222/83 |
| 6,045,000 A | 4/2000 | Rauworth et al. |

OTHER PUBLICATIONS

International Search Report PCT/US02/22170.

* cited by examiner

Primary Examiner—John Rivell
(74) Attorney, Agent, or Firm—Patterson, Thuente, Skaar & Christensen, P.A.

(57) ABSTRACT

A fluid dispensing system for use with a drum with a bung, and a drum insert that includes a downtube that inserts into the bung. A dispense head has provision for a return flow line that discharges recirculated fluid into the annular space around the drum insert downtube. A foaming reduction device minimizes foam created from the recirculation. The invention includes a spring-loaded poppet that closes when the dispense head is removed from the bung opening. The poppet is configured such that the engagement member is a ring shaped with support members extending axially. The engagement member seats on and couples with a nipple on the drum insert.

The nipple has a seating portion to engage the engagement member of the poppet. The invention also includes a seal verification conduit in fluid communication with a space intermediate two seals at a junction between the dispense head and the drum insert.

20 Claims, 6 Drawing Sheets

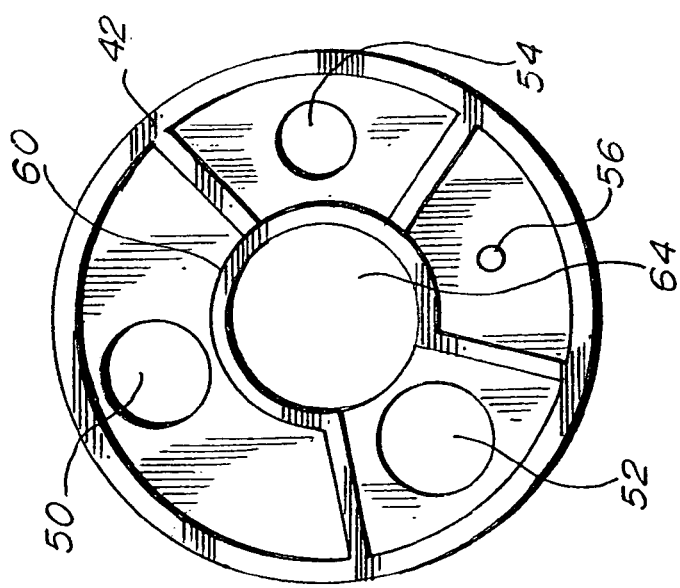
FIG. 11
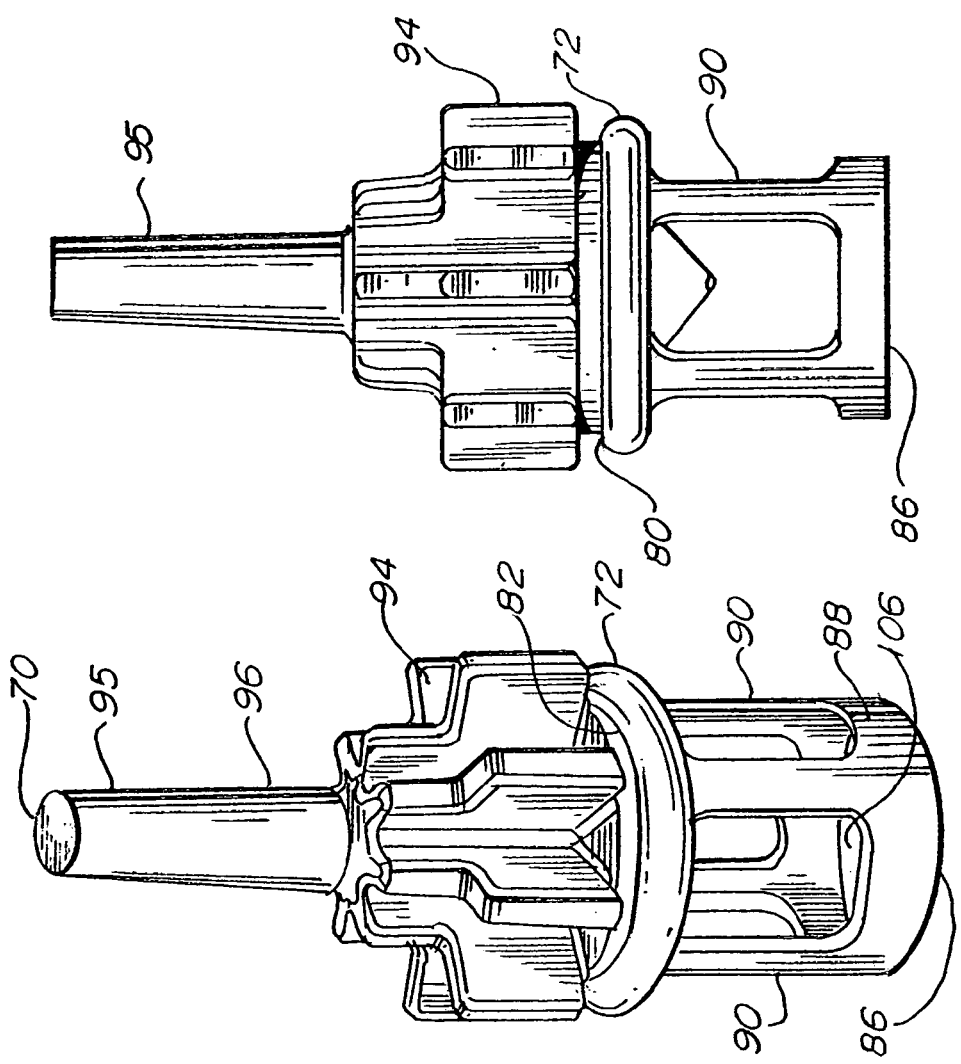
FIG. 10
FIG. 9

HIGH VOLUME DISPENSE HEAD WITH SEAL VERIFICATION AND LOW FOAM RETURN LINE

This application claims benefit of U.S. Provisional Application No. 60/305,061, filed Jul. 12, 2001, said application being incorporated herein by reference.

FIELD OF THE INVENTION

This invention relates to fittings, more particularly, the invention relates to dispense heads with multiple flow passages capable of handling caustic and high purity fluids.

BACKGROUND OF THE INVENTION

In industries such as semiconductor processing, pharmaceutical and chemical manufacturing, high purity, highly corrosive and/or highly caustic liquids are utilized. Due to safety and quality considerations, these liquids must be contained in containers and dispensing systems of high reliability and integrity. The connections, tubing, and fittings for handling these fluids must be formed from highly inert materials. Fluoropolymers have been found to be suitable for use in these environments. The tubing is commonly formed of PFA, the fittings, valve components and dispense heads may be formed of components such as PFA and PTFE, and other fluoropolymers. Containers for handling these liquids are typically plastic drums formed of high purity polyethylene such as shown in U.S. Pat. No. 6,045,000 identified as assigned to Fluoroware, Inc., a predecessor corporation of the owner of this invention. Examples of dispense heads suitable for use with these drums are illustrated in U.S. Pat. No. 4,699,298, assigned to FSI Corporation and 5,108,015 identified as assigned to Fluoroware, Inc. The above three patents are incorporated herein by reference.

The drums, will conventionally, have a bung opening with a drum insert that includes a down hole tubing portion connecting to an upward and concentric nipple. A closure fits on the bung and drum insert for shipment or storage of the drum. A dispense head such as those described above, couples with the insert and has a main fluid passageway that connects to and sealingly engages the nipple.

In certain applications it is desirable to automatically cutoff the flow in the main fluid passageway through the dispense head when the dispense head is removed from the drum. This is conventionally accomplished by a centrally located spring-loaded poppet that depresses into an open position when the dispense head is attached to the drum insert. Such poppets close when the dispense head is removed and thus prevents fluid in the dispense head and main tubing line from spilling out when the dispense head is removed. Such poppets will conventionally have an axial engagement portion that contacts a central seating member centrally supported in the male fluid passageway of the insert by a plurality of spokes. This structure allows the fluid to flow between the spokes. Such an arrangement works well mechanically although the spokes and central seating member interfere with and restrict the main fluid flow.

The dispense head will conventionally have a vent for allowing displaced fluid to be replaced by a gas supplied through a secondary tubing that connects to a fitting on the dispense head. The dispense head may also have a seal verification feature. The dispense head will typically have several concentric O-rings that seal to the drum insert and bung. The seal verification feature constitutes a fitting on the dispense head that connects to a closed chamber between adjacent O-rings. The need to have multiple passageways in the dispense head limits the room available for the main fluid passageway and poppet. Thus, flow rates may be less than ideal.

In many applications, the fluid that is dispensed needs to be recirculated to the drum. This is conventionally accomplished by way of a second dispense head on a second bung opening on the drum. Recirculation of fluid often creates foaming which can cause problems such as foam entry into the vent lines and potential clogging or contamination of normally dry areas of the dispense head and gas refill line, and difficulty in emptying a drum with low levels of fluid.

Generally a recirculation feature would be desirable. A higher flow volume would be desirable in a dispense head that provides poppet shut-off control. Where a drum has a recirculation line, an anti-foaming mechanism would be helpful.

SUMMARY OF THE INVENTION

A fluid dispensing system includes a drum with a bung, a drum insert that includes a downtube that inserts into the bung, and a dispense head that couples with the downtube and has enhanced functional features over known dispense heads. In a preferred embodiment, a dispense head has provision for a return flow line that discharges recirculated fluid into the annular space around the drum insert downtube. A foam restricter device operates to minimize or reduce foam created from the recirculation. In a preferred embodiment, the main flow passage through the dispense head is controlled by a spring-loaded poppet that closes when the dispense head is removed from the bung opening. The poppet is configured such that the engagement member is a ring member with support members extending in an axial direction that seats on and couples with a nipple on the drum insert. The nipple has a seating portion to engage the engagement member of the poppet comprising inwardly extending nubs. Upon engagement the combination of the dispense head and the drum insert has a substantially open main passageway with the only obstructions being the nubs extending radially inward. This arrangement facilitates free high volume flow of liquid from the drum to the dispense head.

A feature of preferred embodiments of the invention is that fluid flow rates are greater with the poppet design of the current invention compared to conventional dispense heads and poppets.

A feature and advantage of preferred embodiments of the invention is that foam production of recirculated fluid is reduced over comparable recirculation systems.

A feature and advantage of preferred embodiments of the invention is that fluid may be recirculated back into the drum through the same dispense head that is utilized for dispensing the fluid.

A feature and advantage of preferred embodiments of the invention is that there is a seal verification feature on the dispense head to verify the integrity of the sealing of the dispense head o-rings.

BRIEF DESCRIPTION OF THE DRAWINGS

FIG. 9 is an elevational view of a poppet in accordance with the invention.

FIG. 10 is a perspective view of the poppet.

FIG. 11 is a cross sectional view of the top portion of the dispense head taken at line 11—11 of FIG. 6.

DETAILED DESCRIPTION OF THE PREFERRED EMBODIMENT

Figure 1:
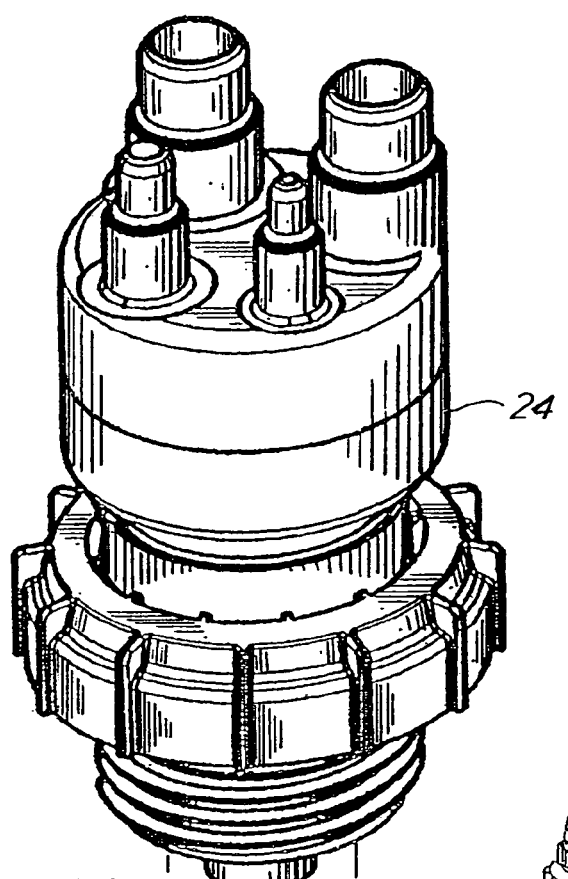
FIG. 1 is a perspective view of a dispense head in accordance with the invention.
Figure 2:
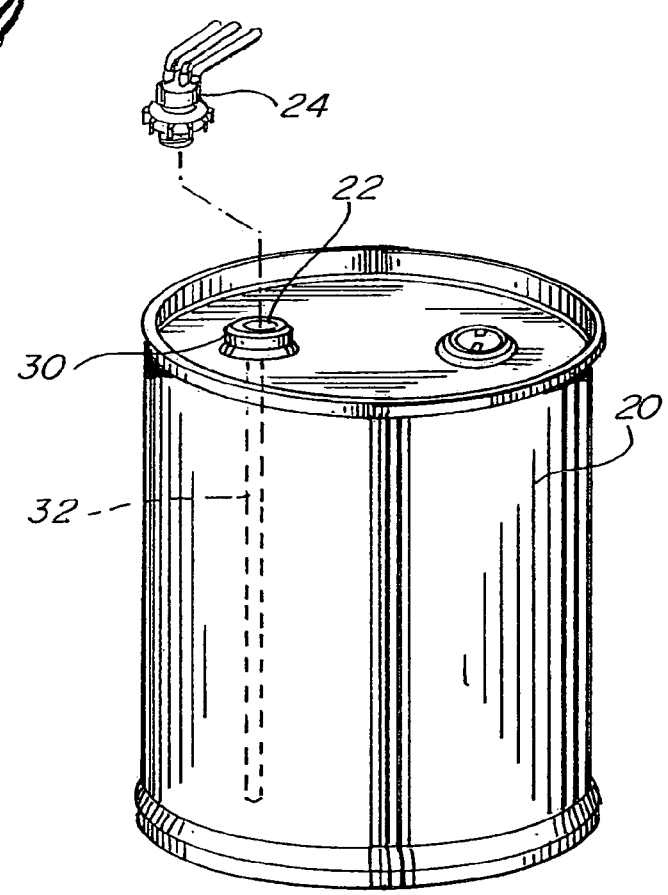
FIG. 2 is a perspective view of a fluid dispensing system in accordance with the invention.

Referring to FIGS. 1 and 2, a fluid dispense system is illustrated and generally includes a drum 20, a drum insert 22, and a dispense head 24. The drum 20 is conventionally made of multiple layers of polyethylene formed in a blow molding process. For the purposes of this application the term dispense heads shall be considered to include fluid return heads.

The drum insert includes a bung attachment portion 30 and a down tube 32. Referring to FIGS. 3, 4, 5, 6, and 7, details of the dispense head and drum insert are illustrated. The dispense head comprises a body portion 40 comprising an upper section 42 and a lower section 44. A plurality of fittings 46 are positioned at the top of the upper section 42 and utilize conventional connections such as Flaretek® connections for attachment of tubing, preferably PFA tubing, to the dispense head. The fittings provide connection to a main fluid conduit 50, a recirculation fluid conduit 52, a vent conduit 54, and a seal verification conduit 56. These conduits are illustrated in FIG. 11, which shows a cross-sectional view at line 11—11 of FIG. 6.

The upper section 42 is appropriately partitioned by integral wall sections 60 defining the various internal conduits. The upper section 42 of the dispense head body portion may be Purebonded® to the lower section 44. The methodology of Purebonding tubular ends is disclosed in U.S. Pat. No. 4,929,293 to Michael Osgar and is indicated to be assigned to Fluoroware, Inc. the owner of this invention. This patent is incorporated herein by reference.

Figure 5:
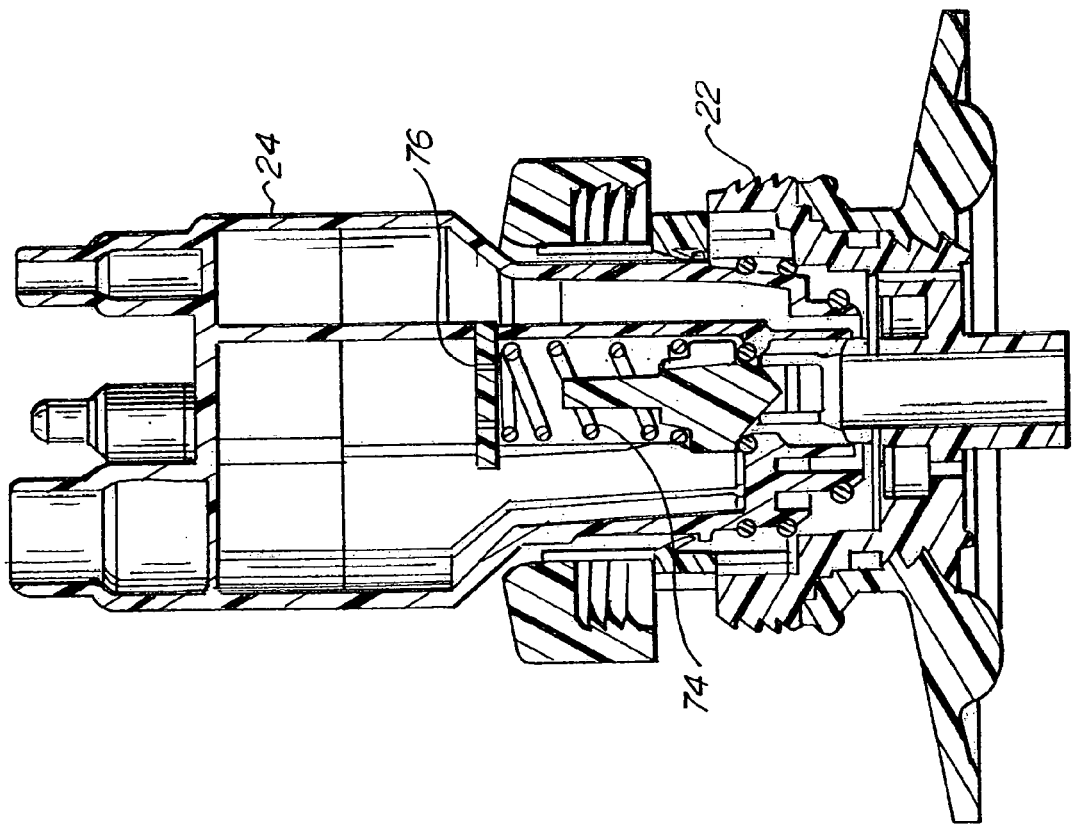
FIG. 5 is a cross sectional view of the dispense head of FIG. 1 taken at line 5—5 of FIG. 4 showing the dispense head separated from a drum insert.
Figure 4:
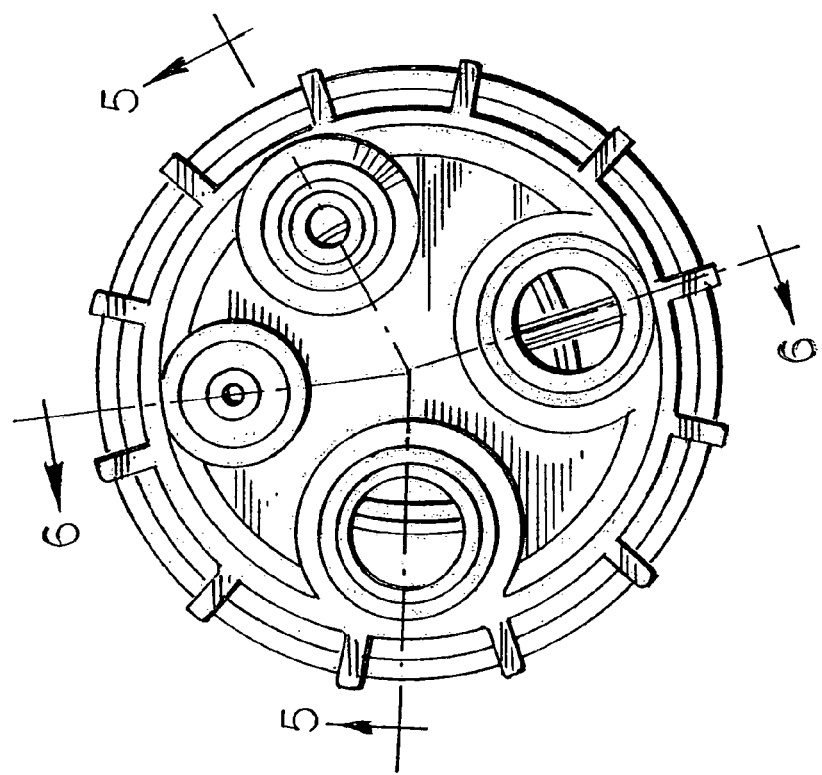
FIG. 4 is a top plan view of the dispense head of FIG. 1.

Positioned in the central chamber 64 of the lower section is a poppet 70, o-ring 72, and a plastic spring 74. O-ring 72 engages and seals against the poppet 70 and integral wall 60 when the poppet 70 is closed. Plastic spring 74 biases poppet 70 toward a closed position and is secured in place by a snap ring 76. When assembled the poppet 70, o-ring 72, spring 74 and snap ring 76 are positioned as best shown in FIG. 5. The poppet 70 is shown in a closed sealing position in FIG. 5 in that the dispense head 24 has not yet fully engaged the drum insert 22.

Details of the poppet 70 are illustrated in FIGS. 9 and 10. The o-ring 72 extends around the sealing section 80 on the central portion 82 of the poppet. A first end 86 includes an engagement portion 88 configured as a ring. Support members 90 extend from the engagement portion to the central portion 82. A plurality of guide members 94, and a central guide 95 extend from the second end 96 to slidably maintain the poppet in the central chamber 64 of the dispense head 24. The spring 74 engages second end 96 and is compressed between the poppet 20 and the snap ring 76 which is suitably fixed in a snap ring groove 102 best shown in FIG. 7. Significantly the poppet has a central open area 106 which allows the passage of fluid into the nipple 112 of the drum insert.

Figure 3:
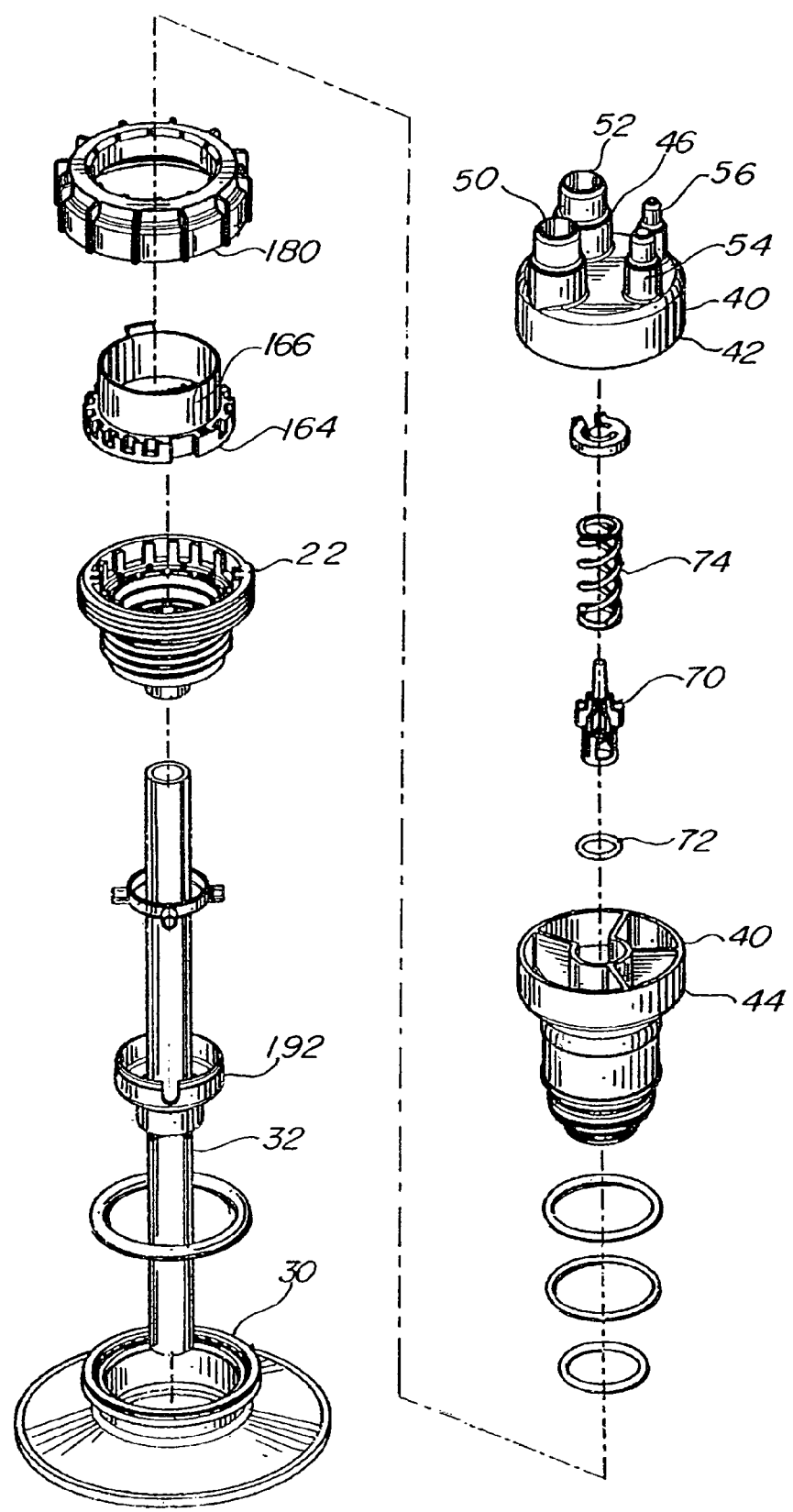
FIG. 3 is an exploded view of the dispense head of FIG. 1.
Figure 6:
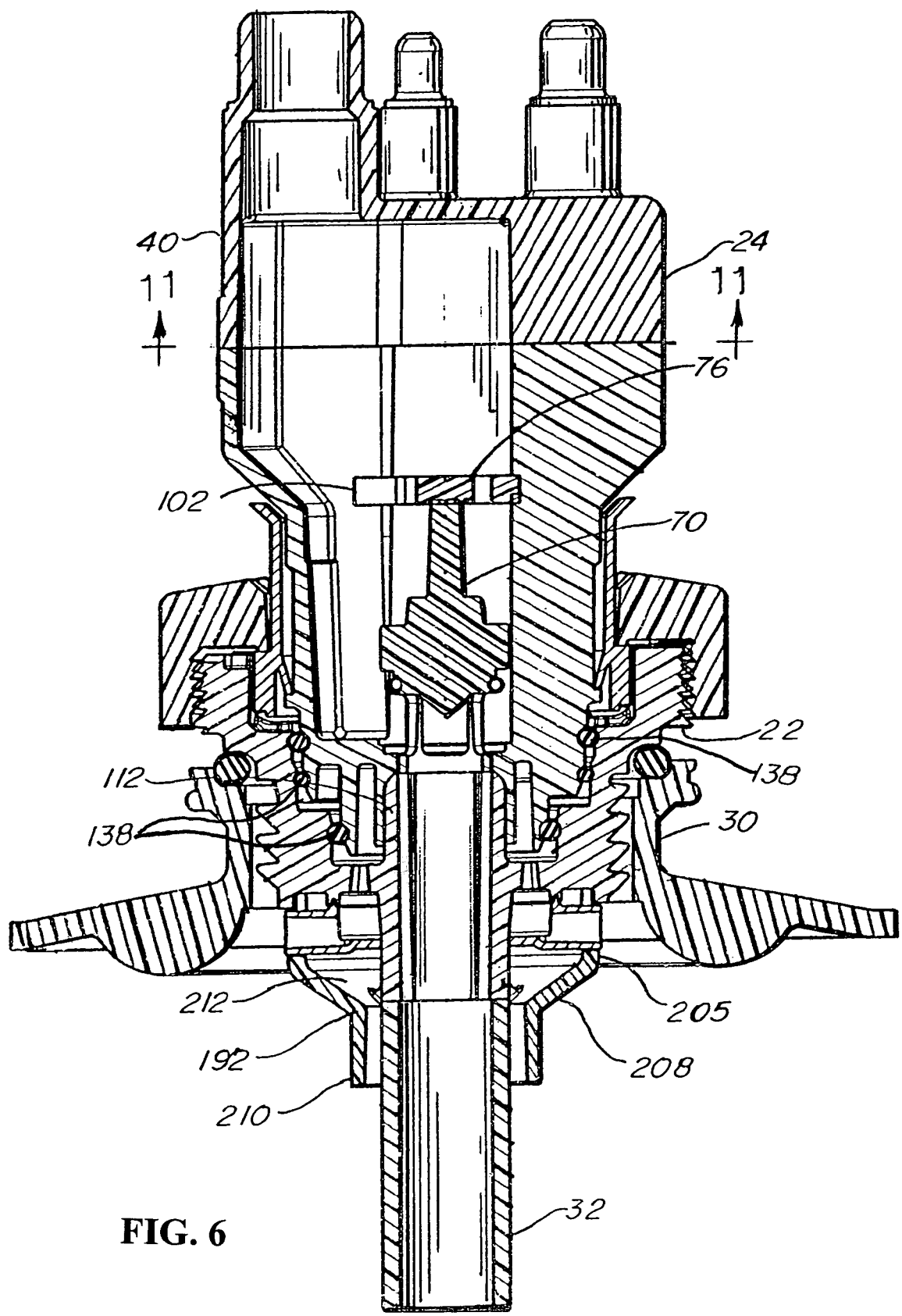
FIG. 6 is a cross sectional view of the dispense head of FIG. 1 taken at line 5—5 of FIG. 4 showing the dispense head attached to the drum insert.
Figure 8:
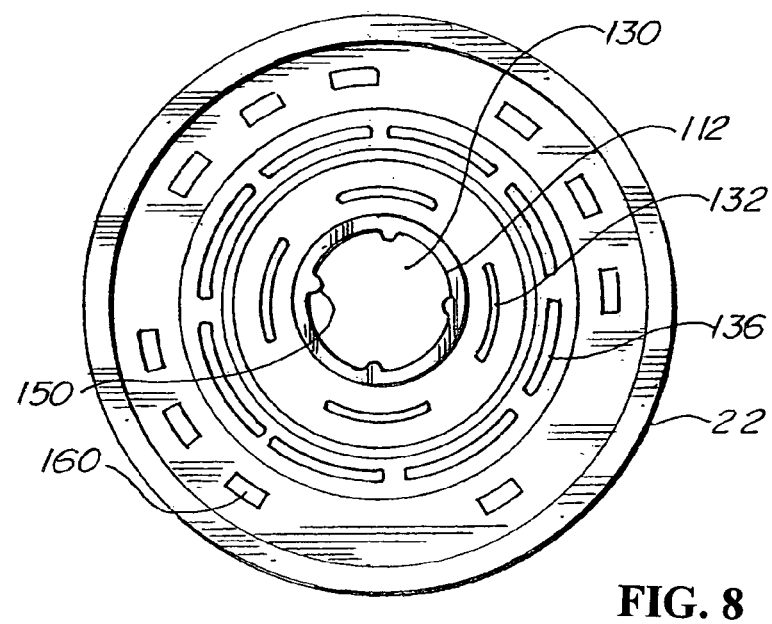
FIG. 8 is a plan view of the drum insert shown in perspective in FIG. 3.

The drum insert 22, as shown in FIGS. 3 and 8, supports nipple 112 which extends upwardly. The drum insert 22, has a central fluid flow conduit 130 that connects to the main fluid dispense conduit 52 in the dispense head 24. A plurality of annular recirculation conduits 132 connect to the recirculation conduit 50 of the dispense head 24. A plurality of vent conduits 136 connect to the vent conduit 54 of the dispense head 24. Sealing surfaces are positioned intermediate each of the conduits in the drum insert for sealingly engaging with o-rings 138 as illustrated in FIGS. 3, 5, and 6. The down tube nipple 112 may have inwardly extending nubs 150 which facilitate engagement of the ring shaped engagement portion 88 of the poppet. The down tube 32 also has a plurality of key sections 160 which assure connection to a proper dispense head 24 by way of corresponding key sections 164 on a key section member 166 which is attached to the body of the dispense head 24. Further a nut 180 is rotatably engaged to drum insert 22 to provide for secure attachment of the dispense head 24 to the drum insert 22.

Figure 7:
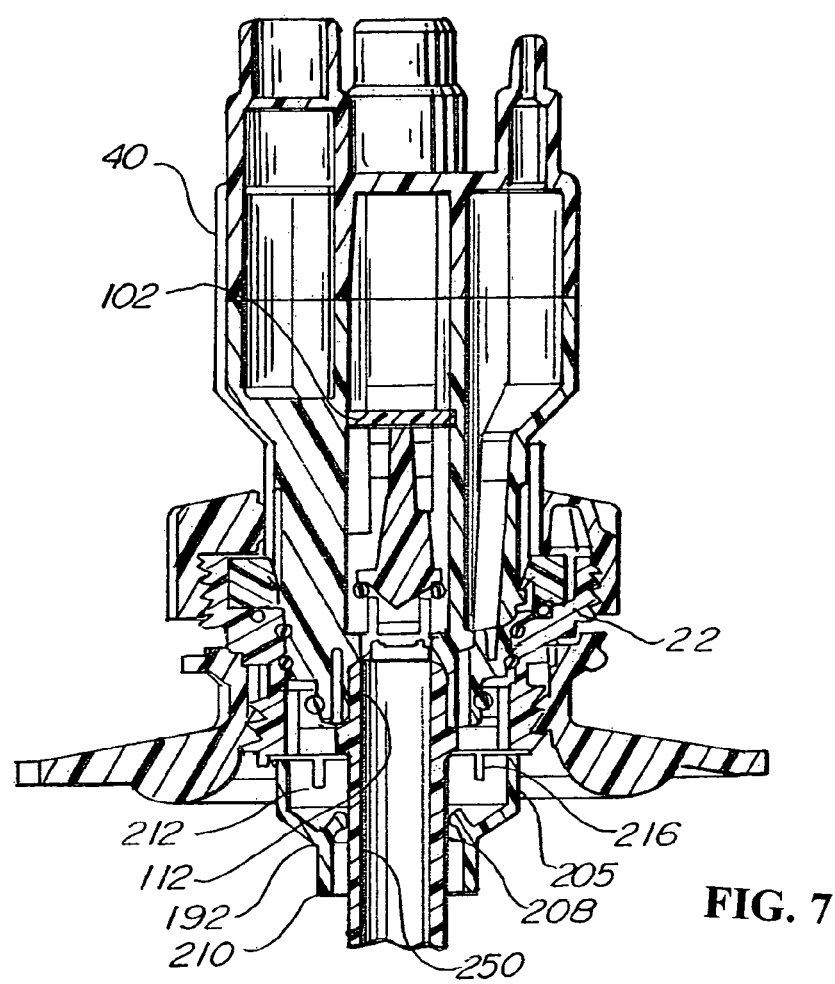
FIG. 7 is a cross sectional view of the dispense head of FIG. 1 taken at 6—6 of FIG. 4.

Referring to FIGS. 1 and 7, a foam reduction member 192 is illustrated. Foam reduction member 192 attaches to and around the down tube 32 of the drum insert 22. The foam reduction member 192 includes wall portion 205, a funnel portion 208, and a discharge portion 210. The wall portion 205 and funnel portion 208 define a foam reduction chamber 212 which has vents 216 positioned therein. The foam reduction member 192 receives recirculation fluid from the recirculation conduit 52 through the dispense head 24 and then through the drum insert 22. The recirculated fluid will often begin foaming before it contacts the remaining fluid in the drum 20. The foam reduction member 192 reduces the velocity of the recirculating fluid and allows for discharge of the fluid around the down tube 32 which provides a settling effect to the recirculated fluid. The foam reduction member 192 has prongs 230 which may engage above a bead 250 on the down tube 32 formed by a Purebond weld.

The foam reduction chamber 212 allows gas to separate from the foam and to discharge through the vents 216 while the liquid portion generally flows down in a settled, laminar type flow. This prevents a more turbulent flow which would be present if fluid was directly discharged into the drum 20 from the drum insert 22 to the top of the level of the fluid in the drum 20.

Thus the invention consists of the above described components which may be utilized individually in dispense heads or fluid return heads. For the purposes of this application fluid return heads are included in the term dispense heads.

The present invention may be embodied in other specific forms without departing from the spirit of any of the essential attributes thereof. Therefore, the illustrated embodiments should be considered in all respects as illustrative and not restrictive, reference being made to the appended claims rather than to the foregoing description to indicate the scope of the invention.

What is claimed is:

1. A dispense head configured to couple to a drum insert, the dispense head formed primarily of fluoropolymer and comprising:

a main fluid flow line having a poppet;

the poppet having a ring shaped engagement portion with an open central area and a plurality of axial support members supporting the engagement portion;
a plurality of fluid flow passageways extending between the support members;
the poppet positioned to confront a nipple on the drum insert and to provide a main fluid dispense pathway through the center of the ring shaped engagement portion thereby providing increased flow rate, in which the nipple of the drum insert comprises a plurality of nubs protruding into a central fluid chamber whereby the poppet is opened as the dispense head is inserted into the drum insert and substantially free fluid flow is achieved.

2. A dispense head configured to couple to a drum insert, the dispense head formed primarily of fluoropolymer and comprising:
a main fluid flow line having a poppet;
the poppet having a ring shaped engagement portion with an open central area and a plurality of axial support members supporting the engagement portion;
a foaming reduction member to reduce foaming of fluid returning to the drum,
a plurality of fluid flow passageways extending between the support members;
the poppet positioned to confront a nipple on the drum insert and to provide a main fluid dispense pathway through the center of the ring shaped engagement portion thereby providing increased flow rate.

3. The dispense head of claim 2, in which the foaming reduction member comprises a chamber having vents whereby gas is separated from the foam and the gas is vented from the chamber and a liquid flows out of the chamber, the liquid flow surrounding a downtube in a substantially laminar flow.

4. A dispense head configured to couple to a drum insert, the dispense head formed primarily of fluoropolymer and comprising:
a main fluid flow line having a poppet;
the poppet having a ring shaped engagement portion with an open central area and a plurality of axial support members supporting the engagement portion;
a plurality of fluid flow passageways extending between the support members;
the poppet positioned to confront a nipple on the drum insert and to provide a main fluid dispense pathway through the center of the ring shaped engagement portion thereby providing increased flow rate; and
a seal verification conduit in fluid communication with a space intermediate two seals at a junction between the dispense head and the drum insert.

5. A dispense system comprising;
a dispense head attachable to a drum insert in a drum;
the drum insert having a downtube extending towards a bottom of the drum and a nipple;
the dispense head having a first fluid dispense conduit in fluid communication with the downtube;
a poppet located in the first fluid dispense conduit, the poppet comprising a ring shaped engagement member adapted to engage the nipple, a plurality of support members connecting the engagement member to the sealing portion; and
a foaming reduction member in fluid communication with the interior of the drum and with the second recirculating fluid conduit.

6. The dispense system of claim 5, in which the foaming reduction member comprises a chamber having vents whereby gas is separated from the foam and discharged from the chamber and a liquid flows out of the chamber in a substantially laminar flow positioned in the second conduit.

7. A dispense system comprising:
a dispense head attachable to a drum insert in a drum;
the drum insert having a downtube extending towards a bottom of the drum and a nipple;
the dispense head having a first fluid dispense conduit in fluid communication with the downtube; and
a poppet located in the first fluid dispense conduit, the poppet comprising a ring shaped engagement member adapted to engage the nipple, a plurality of support members connecting the engagement member to the sealing portion,
in which a seating portion of the drum insert comprises a plurality of nubs protruding into a central fluid chamber whereby the poppet is opened as the dispense head is inserted into the drum insert and substantially free fluid flow is achieved.

8. A dispense system comprising:
a dispense head attachable to a drum insert in a drum;
the drum insert having a downtube extending towards a bottom of the drum and a nipple;
the dispense head having a first fluid dispense conduit in fluid communication with the downtube; and
a poppet located in the first fluid dispense conduit, the poppet comprising a ring shaped engagement member adapted to engage the nipple, a plurality of support members connecting the engagement member to the sealing portion; and
a seal verification conduit in fluid communication with a space intermediate two seals at a junction between the dispense head and the drum insert.

9. A dispense system comprising:
a dispense head attachable to a drum insert in a drum;
the drum insert having a downtube extending towards a bottom of the drum and a nipple;
the dispense head having a first fluid dispense conduit in fluid communication with the downtube;
a poppet located in the first fluid dispense conduit, the poppet comprising a ring shaped engagement member adapted to engage the nipple, a plurality of support members connecting the engagement member to the sealing portion; and
a seal verification conduit in fluid communication with a space intermediate two seals at a junction between the dispense head and the drum insert.

10. A method of recirculating liquid to a drum through a dispense head, the method comprising the steps of:
inserting a drum insert into a drum and the dispense head into the drum insert, the drum insert comprising a nipple;
including, in the dispense head, a main fluid conduit, a recirculation fluid conduit and a vent conduit;
inserting into the main fluid conduit a poppet, the poppet comprising a ring shaped engagement member adapted to engage the nipple, a sealing portion, a plurality of support members connecting the engagement members to the sealing portion; and
means for biasing the poppet toward a closed position such that the poppet is opened by the act of inserting the dispense head into the drum insert;
venting gas into and out of the drum via the vent conduit to compensate for the displacement of liquid in the drum; and
interposing a foaming reduction member between the dispense head and the drum insert.

11. A method of recirculating liquid to a drum through a dispense head, the method comprising the steps of:

inserting a drum insert into a drum and the dispense head into the drum insert, the drum insert comprising a nipple;

including, in the dispense head, a main fluid conduit, a recirculation fluid conduit and a vent conduit;

inserting into the main fluid conduit a poppet, the poppet comprising a ring shaped engagement member adapted to engage the nipple, a sealing portion, a plurality of support members connecting the engagement member to the sealing portion; and means for biasing the poppet toward a closed position such that the poppet is opened by the act of inserting the dispense head into the drum insert;

venting gas into and out of the drum via the vent conduit to compensate for the displacement of liquid in the drum; and including, in the dispense head, a seal verification conduit in fluid communication with a space intermediate two seals at a junction between the dispense head and the drum insert.

12. A dispense head configured to couple to a drum insert, the dispense head formed primarily of fluoropolymer and comprising:

a main fluid flow line having a poppet;

the poppet comprising means for biasing the poppet toward a closed position such that the poppet is opened by the act of inserting the dispense head into the drum insert;

a recirculation fluid conduit;

a vent conduit; and a foaming reduction member in fluid communication with the recirculation fluid conduit to reduce foaming of fluid returning to the drum.

13. The dispense head of claim 12, in which the foaming reduction member comprises a chamber having vents whereby gas is separated from the foam and the gas is vented from the chamber and a liquid flows out of the chamber, the liquid flow surrounding a downtube in a substantially laminar flow.

14. The dispense head of claim 13, in which the foaming reduction member comprises a cylindrical portion and a conical portion.

15. The dispense head of claim 12, the poppet having a ring shaped engagement portion with an open central area and a plurality of axial support members supporting the engagement portion and in which the nipple of the drum insert comprises a plurality of nubs protruding into a central fluid chamber whereby the poppet is opened as the dispense head is inserted into the drum insert and substantially free fluid flow is achieved.

16. The dispense head of claim 12, further comprising a seal verification conduit in fluid communication with a space intermediate two seals at a junction between the dispense head and the drum insert.

17. A method of reducing foaming while recirculating liquid to a drum through a dispense head, the method comprising the steps of:

inserting a drum insert into a drum and the dispense head into the drum insert;

including, in the dispense head, a main fluid conduit, a recirculation fluid conduit and a vent conduit;

inserting into the main fluid conduit a poppet, the poppet comprising means for biasing the poppet toward a closed position such that the poppet is opened by the act of inserting the dispense head into the drum insert;

interposing a foaming reduction member in fluid communication with the recirculation fluid conduit between the dispense head and the drum insert; and venting gas into and out of the drum via the vent conduit to compensate for the displacement of liquid in the drum.

18. The method of claim 17, further comprising the step of including, in the dispense head, a seal verification conduit in fluid communication with a space intermediate two seals at a junction between the dispense head and the drum insert.

19. The method of claim 17, further comprising the step of opening the poppet by engaging the dispense head to the drum insert and confronting the engagement member with a nipple thereby overcoming the biasing force of the biasing means and opening the poppet.

20. The method of claim 17, further comprising the step of directing fluid out of the drum via the main fluid conduit and returning fluid to the drum via the recirculation fluid conduit and the foaming reduction member.

* * * * *